US011523152B2

(12) United States Patent
Edwards et al.

(10) Patent No.: US 11,523,152 B2
(45) Date of Patent: Dec. 6, 2022

(54) DYNAMIC VIDEO BACKGROUND RESPONSIVE TO ENVIRONMENTAL CUES

(71) Applicant: AT&T Intellectual Property I, L.P., Atlanta, GA (US)

(72) Inventors: Gregory W. Edwards, Austin, TX (US); Michael Gonzales, Austin, TX (US); Sarah Everett, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/325,631

(22) Filed: May 20, 2021

(65) Prior Publication Data
US 2021/0274230 A1    Sep. 2, 2021

Related U.S. Application Data

(63) Continuation of application No. 17/031,194, filed on Sep. 24, 2020, now Pat. No. 11,044,500, which is a continuation of application No. 16/391,528, filed on Apr. 23, 2019, now Pat. No. 10,827,206.

(51) Int. Cl.
*H04N 21/2343* (2011.01)
*H04N 21/442* (2011.01)
*H04N 21/2668* (2011.01)
*H04N 21/475* (2011.01)

(52) U.S. Cl.
CPC ... *H04N 21/23439* (2013.01); *H04N 21/2668* (2013.01); *H04N 21/44222* (2013.01); *H04N 21/4755* (2013.01)

(58) Field of Classification Search
CPC .................................................. H04N 21/23439
See application file for complete search history.

(56) References Cited

U.S. PATENT DOCUMENTS

| | | |
|---|---|---|
| 2016/0055857 A1 | 2/2016 | Johnston |
| 2017/0125059 A1* | 5/2017 | Zich ..................... G11B 27/034 |
| 2017/0351768 A1* | 12/2017 | Nagao ................... G06F 16/436 |
| 2018/0035216 A1 | 2/2018 | Van Hasselt et al. |
| 2018/0078735 A1 | 3/2018 | Dalgleish et al. |
| 2018/0122353 A1 | 5/2018 | Braasch et al. |
| 2018/0344968 A1 | 12/2018 | Gordon et al. |

(Continued)

OTHER PUBLICATIONS

Mehta, Ravi, "Is Noise Always Bad? Exploring the Effects of Ambient Noise on Creative Cognition", https://www.jstor.org/stable/10.1086/665048, Journal of Consumer Research, Inc. vol. 39, Dec. 2012, Mar. 14, 2019, 17 pages.

(Continued)

*Primary Examiner* — Michael H Hong
(74) *Attorney, Agent, or Firm* — Guntin & Gust, PLC; Douglas Schnabel

(57) ABSTRACT

Aspects of the subject disclosure may include, for example, generating a video scene adapted to establish an ambiance setting and providing the video scene to equipment of a user for presentation at a display device. A visual focus is detected of the user towards presentation of the video scene displayed proximate to the user and the video scene is modified responsive to the visual focus. The modifying of the video scene is adapted to discourage visual focus of the user towards the presentation of the video scene. Other embodiments are disclosed.

20 Claims, 9 Drawing Sheets

(56) References Cited

U.S. PATENT DOCUMENTS

2018/0352364 A1 12/2018 Prasad et al.
2020/0344508 A1 10/2020 Edwards et al.
2021/0014545 A1 1/2021 Edwards et al.

OTHER PUBLICATIONS

Mynoise, "Focus and Work—Relax At Home—Sleep At Night", https://mynoise.net/, Mar. 14, 2019, 4 pages.
Mynoise, "The Ultimate Cafe Restaurant Background Noise Generator", https://mynoise.net/NoiseMachines/cafeRestuarantNoiseGenerator.php, Mar. 14, 2019, 2 pages.
Mynosie, "Calibrated Background Noise Generators", https://mynoise.net/preface.php, Mar. 14, 2019, 4 pages.

\* cited by examiner

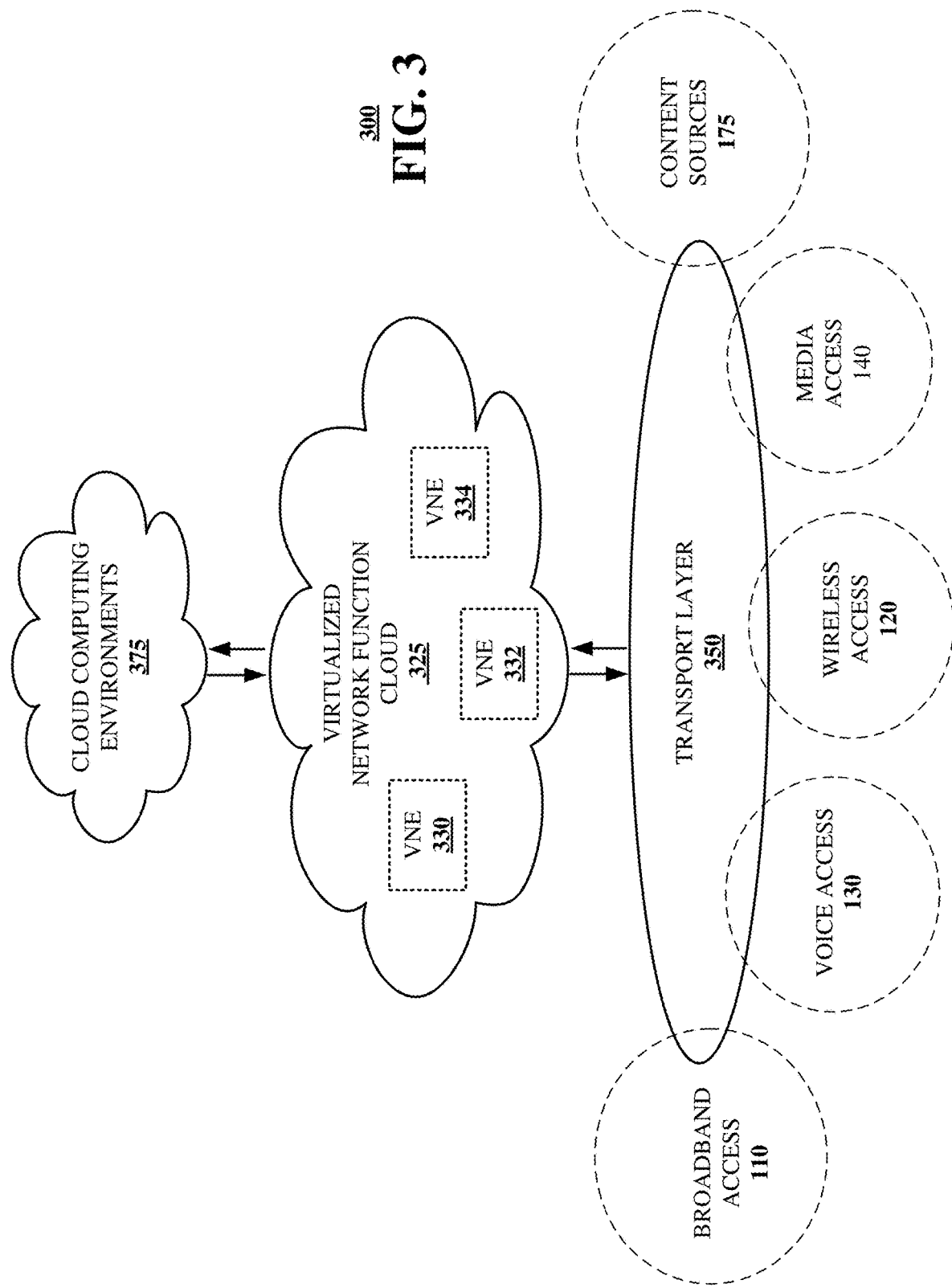

DYNAMIC VIDEO BACKGROUND RESPONSIVE TO ENVIRONMENTAL CUES

CROSS REFERENCE TO RELATED APPLICATIONS

This application is a continuation of U.S. patent application Ser. No. 17/031,194 filed Sep. 24, 2020, which is a continuation of U.S. patent application Ser. No. 16/391,528 filed Apr. 23, 2019 (now Issued U.S. Pat. No. 10,827,206). The contents of each of the foregoing are hereby incorporated by reference into this application as if set forth herein in full.

FIELD OF THE DISCLOSURE

The subject disclosure relates to a dynamic video background that responds to environmental cues

BACKGROUND

It is not uncommon for someone engaging in a personal activity to place themselves in an environment, which they personally find conducive to the goal at hand. For example, a student studying may be more productive doing so at a bustling coffee shop instead of a quiet library. Objectively, the library may seem a more suitable location for studying, and for some it may be. However, others may find the background noise, e.g., music, soft conversations, the clanging of silverware and dishes, actually serves as aid in keeping their focus. It can often be a very personal choice. Likewise, some may require absolute quite for sleeping or relaxing, while others may prefer background noise, e.g., soft music, white noise, rain falling.

Noise machines, e.g., myNoise®, available as an app in the iTunes® App Store and Google Play® produce background noises referred to as soundscapes. For example, a user may select an environment using the app, such as a café restaurant. A background noise generator provides a soundscape that simulates a café restaurant environment. In the online example, accessible at https://mynoise.net/, a user is presented with controls to increase or decrease various aspects of the soundscape, such as restaurant noises, chatter, babble, kitchen noises and so on.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
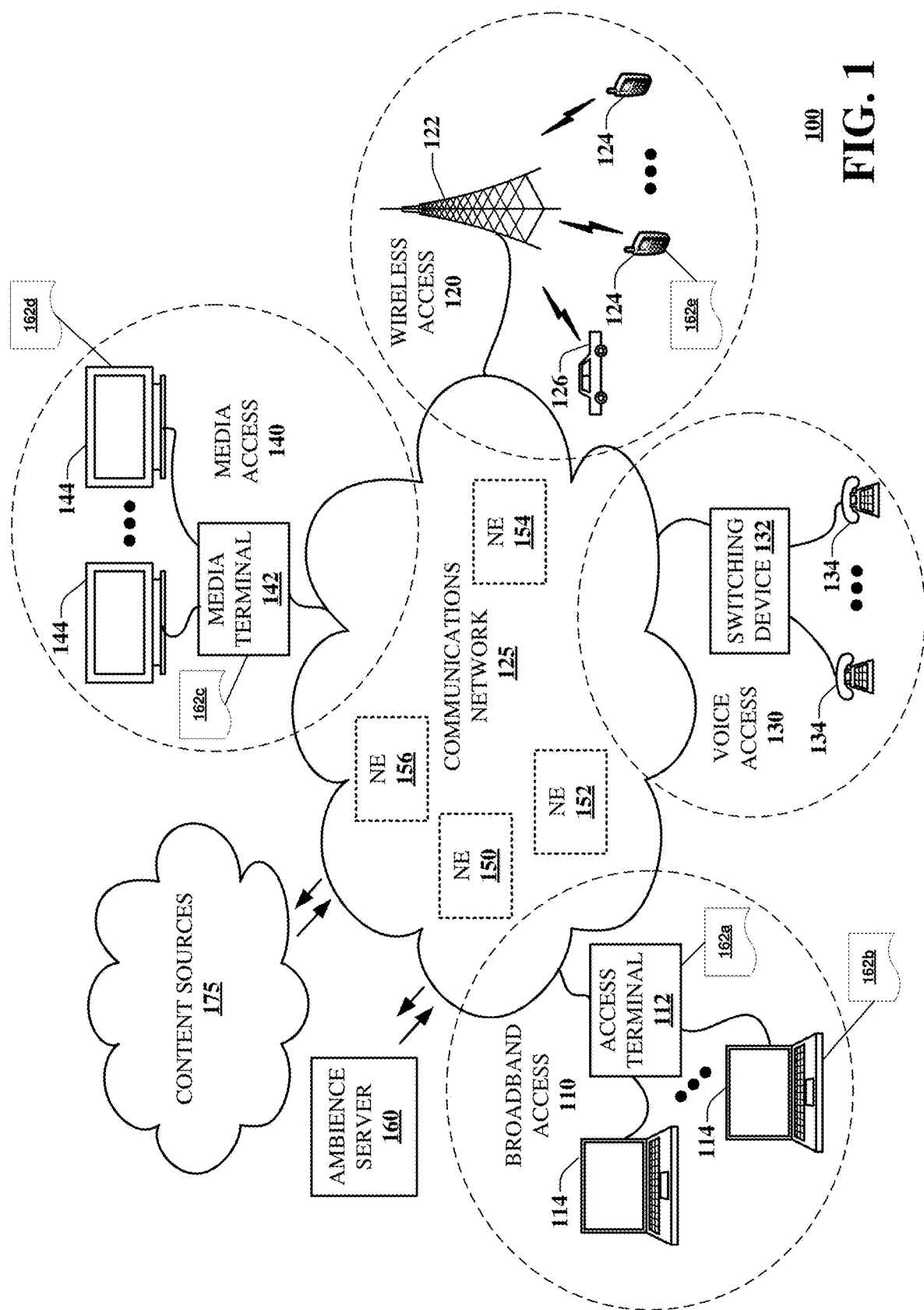
FIG. 1 is a block diagram illustrating an exemplary, non-limiting embodiment of a communications network in accordance with various aspects described herein.

It has been reported that over 70% of network subscribers keep their television set (TV) on as background noise and/or entertainment at some point throughout each day. Yet the video experience is extremely one-way, requiring the user to look and search for video content that provides comfort and security, which will be consumed without requiring the user's engagement. Moreover, such content can be difficult to find or even non-existent. Consequently, the user may be distracted by the video, e.g., becoming engaged in programming that was intended for background consumption, or requiring the user to once again look and search for new video content in their pursuit of finding comfort and/or security.

The subject disclosure describes, among other things, illustrative embodiments of systems, methods and software adapted for generating video content suitable for adding and/or altering the ambiance of a particular location or environment. In particular, selection and/or generation of the video content can be tailored to a particular user, for example, according to an expressed user preference or to promote a predetermined effect as perceived by the user. Alternatively or in addition, generation of the video content, e.g., a videoscape, can be tailored more generally to alter a user's individual and even changing mood, thereby enhance a user's performance by promoting a user's achievement of their desired state, mood or goal, e.g., relaxed, drowsy, hyped. In particular, the video content is not generated to entice a user to watch it, but rather to support a viewer's activity other than watching the video, while then video is being presented in a background sense with respect to the user's other activity or object of focus.

It is understood that the video component can be used alone or combined with other elements, such as audio. The audio, when provided may be related and/or unrelated to the generated video content. In at least some embodiments, generation of the video, and optionally the audio content is dynamic. For example, the generation of the video can be reactive to stimulus, such as noises, movement and/or other environmental factors as disclosed more fully below. Other embodiments are described in the subject disclosure.

One or more aspects of the subject disclosure include a process that includes receiving, by a processing system including a processor, an ambiance selection of a number of different ambiance choices. A video scene is generated by the processing system according to the ambiance selection and forwarded to a display device for presentation by the display device at location proximate to a user. Sensory input obtained from the location proximate to the user is monitored by the processing system. The processing system modifies the video scene according to the sensory input to obtain a modified video scene. The modified video scene is forwarded by the processing system to the display device for presentation of the modified video scene by the display device at the location proximate to the user.

One or more aspects of the subject disclosure include device that includes a processing system having a processor and a memory that stores executable instructions. The instructions, when executed by the processing system, facilitate performance of operations, which include determining an ambiance selection of a plurality of different ambiance choices, generating a video scene according to the ambiance selection of the plurality of different ambiance choices, and forwarding the video scene to a display device for presentation by the display device at a location proximate to a user. Sensory input obtained from the location proximate to the user is monitored. The video scene is modified according to the sensory input to obtain a modified video scene, which is forwarded to the display device for presentation by the display device at the location proximate to the user.

One or more aspects of the subject disclosure include non-transitory, machine-readable medium, including executable instructions that, when executed by a processing system including a processor, facilitate performance of operations. The operations include determining an ambiance selection of a plurality of different ambiance choices, producing a video scene according to the ambiance selection of the plurality of different ambiance choices, and providing the video scene to a display device for presentation by the display device at a location proximate to a user. Sensory input obtained from the location proximate to the user is monitored and the video scene is modified according to the sensory input to obtain a modified video scene. The modified video scene is forwarded to the display device for presentation by the display device at the location proximate to the user.

Referring now to FIG. 1, a block diagram is shown illustrating an example, non-limiting embodiment of a communications system 100 in accordance with various aspects described herein. For example, communications system 100 can facilitate in whole or in part generation of video content suitable for adding and/or altering the ambiance of a particular location or environment, for altering a mood and/or behavior of a viewer, and the like. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

According to the illustrative embodiments, the communications system 100 includes an ambiance server 160 adapted to generate video and/or audiovisual content suitable for adding and/or altering the ambiance of a particular location or environment, for altering a mood and/or behavior of a viewer. One or more user devices, such as the access terminal 112 and/or the data terminals 114 implement software 162*a*, 162*b*, e.g., programs or apps that cooperate with the ambiance server 160 to access and present the video and/or audiovisual content on a display. Likewise, other user devices, such as the media terminal 142 and/or the audio/video display devices 144 implement software 162*c*, 162*d*, e.g., programs or apps that cooperate with the ambiance server 160 to access and present the video and/or audiovisual content on a display. It is conceivable that other mobile devices 124 can implement similar software 162e to achieve similar results. Although an ambiance server 160 is illustrated, it is conceivable that in at least some embodiments, one or more of the software elements 162a, 162b, 162c, 162d, 162e, generally 162, can be adapted to generate natively, i.e., without the assistance of the ambiance server 160, the video and/or audiovisual content suitable for adding and/or altering the ambiance of a particular location or environment, for altering a mood and/or behavior of a viewer.

Figure 2A:
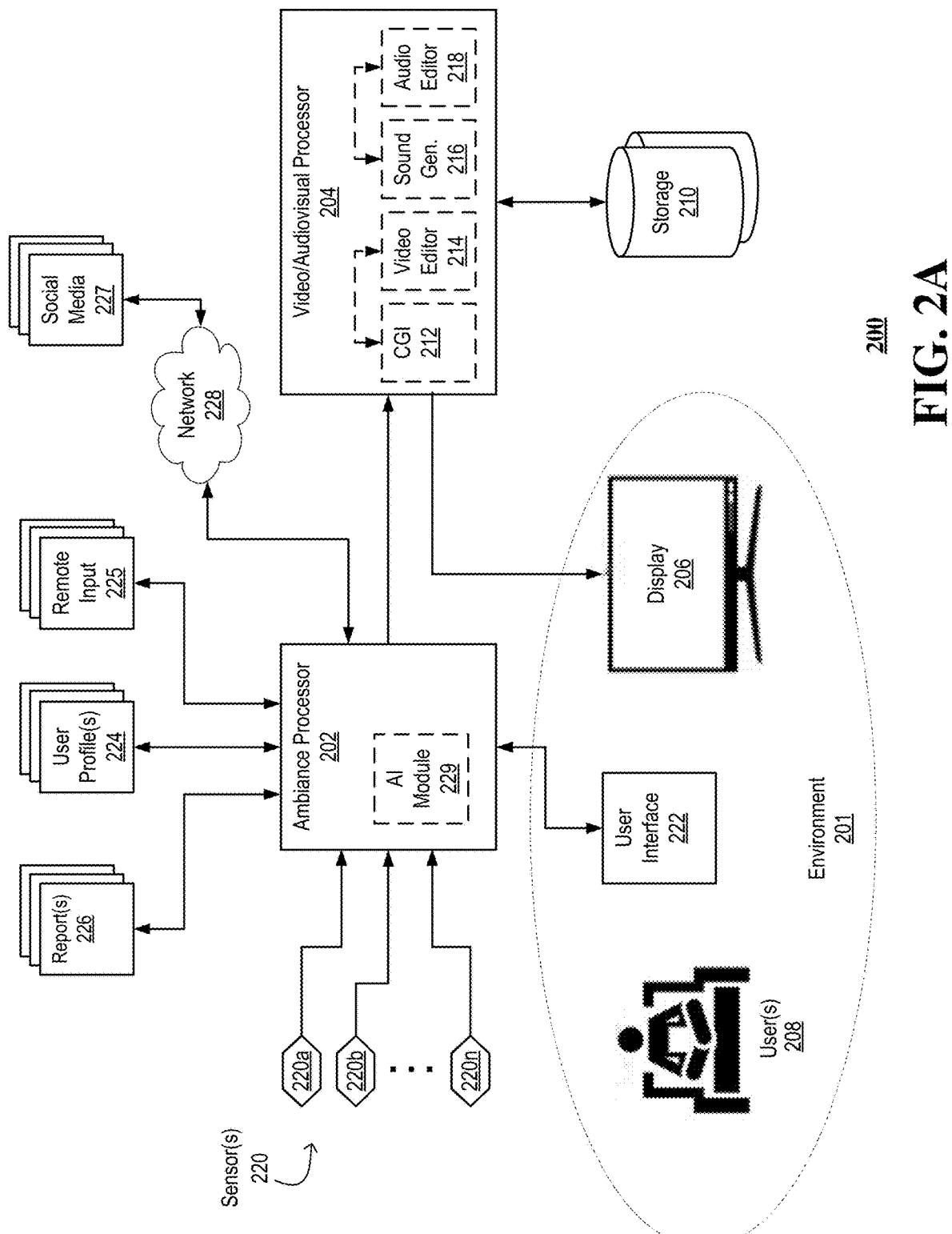
FIG. 2A is a block diagram illustrating an example, non-limiting embodiment of an ambiance system functioning within the communication network of FIG. 1 in accordance with various aspects described herein.

FIG. 2A is a block diagram illustrating an example, non-limiting embodiment of an ambiance system 200 that can function within the communication network of FIG. 1 in accordance with various aspects described herein. At least one solution to identifying background video includes getting one or more parameters, such as an emotional state of a user, an audio sample of the user, e.g., a current audio sample, a history, e.g., previous usage, the user's location, type of location, current or planned task to be performed during presentation of the video, and/or user preference data. One or more of these or other parameters can be used by the system 200 to create a dynamic background video scene that fulfills their needs at that time. Without limitation, the user of dynamic can refer to a scene that changes over time in response to a predetermined plan, e.g., a story line, plot or algorithmic progression determined according to the sampled parameters. Alternatively or in addition, dynamic can refer to a scene that changes in response to updated sampled parameters, e.g., a scene in which one or more elements of the scene interact with the user or react to other changes related to the user and/or the environment in which the user resides. In at least some embodiments, an amount of dynamics, e.g., interaction, can be managed according to the techniques disclosed herein at a level that is suitable for the user's particular and perhaps changing needs and in a way that can be personalized to them.

The example ambiance system 200 includes an ambiance processor 202 in communication with a video processor 204, which is in further communication with a display device 206. The ambiance processor 202 is adapted to identify a target ambiance, mood, and/or setting that is adapted to establish or otherwise alter an ambiance of an environment 201 by presentation of selected and/or generated video and/or audiovisual content at the display device 206. Typically, the ambiance is determined according to one or more users 208 within a viewing area of the display device 206.

The video processor 204, sometimes referred to as an audiovisual processor or video/audiovisual processor 204, is adapted to select, alter and/or generate video content. In at least some instances, the generated audiovisual content is based on input received from the ambiance processor 202. For example, the video/audiovisual processor 204 may select a video clip or program from a video library accessible on a video storage repository 210. In this instance, a selection from the library collection is according to input from the ambiance processor 202. Although the illustrative example includes a storage repository 210, it is envisioned that video clips and/or programs can be obtained from other sources, such as streaming media service providers, broadcast services, cloud services, private collections, digital video recorders (DVRs) and the like.

The background video itself can be displayed on any type of monitor (TV, full-wall video, phone, tablet, immersive video viewers, etc.). The selected video content can be composed of existing shows or video clips the user likes but has not shown or otherwise indicated a substantial emotional engagement with (has not shown emotions of security or comfort with). More interestingly the selected video content could also be composed of video from real-world places such as cities, populated places such as cafes, city streets, subways, jungles, arctic, etc. The content may be real-time, e.g., being obtained from streaming media of a location obtained from a remote camera placed at that location, or from pre-recorded samples obtained from such locations. The selected content may also be of specific activities (skiers, runners, etc.) shown in the video, or presented from the active party's perspective, e.g., obtained using a GoPro® camera, as if the user is engaging in that activity. Several variations of the scene would be created either by video recording and/or video streaming actual reactions to things and having several versions of the scene that can be played whenever the ambiance processor 202 determines that the dynamics of a scene being presented should include interactions. Variations of the scene could also be created by artificially modifying the video itself.

In some embodiments, the video/audiovisual processor 204 includes a computer-generated image (CGI) module 212 (shown in phantom). The CGI module 212 can be adapted to generate image and/or video content algorithmically responsive to the input received from the ambiance processor 202. In at least some embodiments the entire video and/or audio portion is generated by the CGI module 212, e.g., as is common in computer game applications. Alternatively or in addition, a video clip and/or program obtained from the storage repository 210 is modified or otherwise used by the CGI module 212 for generation of the video/audiovisual content. For example, a static scene or video clip can be used as a template, e.g., a background for further modification by the CGI module 212.

In some embodiments, the video/audiovisual processor 204 includes a video editor 214 (shown in phantom). The video editor 214 can be adapted to edit a video clip and/or program obtained from the storage repository 210. For example, the video editor 214 may alter a color scheme, an intensity, apply an image and/or video filter, e.g., diffusion filter, and the like. Alternatively or in addition, the video editor 214 can add and/or remove elements from the generated video. By way of example, the video editor 214 can include background features and/or characters to an existing video or an artificially generated video clip. The background features and/or characters can be included and/or adapted algorithmically responsive to the received input from the ambiance processor 202.

According to artificially modification, the video can have scenes that are recreated with CGI based on the actual live video input and then have CGI content, such as background items and/or characters created from that scene. By monitoring the activity or motions of the actors in the live or recorded video content and/or using databanks of activity and/or movement/sound information that already exist, the CGI characters can be presented according to one or several movement patterns that can be pre-determined and ready to play, e.g., overlaying the video scene when deemed appropriate, e.g., in reaction to a movement of the user 208 and/or movement or noise from the environment 201. For example, the CGI module 212 creates a twin from a live penguin of a video scene. The video processor 204, e.g., using the video editor 214, presents the CGI twin in an overlay fashion with the real video scene to show the CGI twin penguin waving at the user 208 when the user says "hello." In some instances, CGI characters are created by the CGI module 212 beforehand and inserted into any scene. For example, if the system determines that the user 208 loves turtles, the CGI module 212 can generate a CGI turtle that can be presented by the video processor 204 as an overlay in a real video scene, sitting on a real video scene of a rock in a pond. There exist an ability to create and modify CGI characters or CGI changes to the video in real-time based on Artificial Intelligence (AI) input that guides the creation of things and/or interactions with such things that the particular user 208 has previously reacted favorably to or which the ambiance processor 202 may determine that the user 208 would like based on other data.

Likewise, in some embodiments, the video/audiovisual processor 204 includes a sound generator 216 (shown in phantom). The sound generator 216 can be adapted to generate sounds and/or audio content algorithmically responsive to the input received from the ambiance processor 202. In at least some embodiments the entire audio portion of generated audiovisual content is produced by the sound generator 216, e.g., as is also common in computer game applications. Alternatively or in addition, an audio clip and/or audio program obtained from the storage repository 210 is modified or otherwise used by the sound generator 216 for generation of the audio portion of audiovisual content. For example, a soundtrack, e.g., prerecorded background noise obtained from a real environment and/or prerecorded music is further modification by the sound generator 216.

In some embodiments, the video/audiovisual processor 204 includes an audio editor 218 (shown in phantom). The audio editor 218 can be adapted to edit an audio clip and/or program obtained from the storage repository 210. For example, the audio editor 218 may alter one or more of a level, an intensity, and the like, of the existing audio clip/program. Alternatively or in addition, the audio editor 218 can add and/or remove audio elements from the generated audio portion of the audiovisual content. By way of example, the audio editor 218 can include background features and/or characters to an existing audio or an artificially generated audio clip. The background features and/or characters can be included and/or adapted algorithmically responsive to the received input from the ambiance processor 202, e.g., adding additional tracks to a multitrack audio portion.

It is understood that in at least some embodiments, the ambiance system 200 includes one or more sensors 220a, 220b . . . 220n, generally 220. Without limitation, the sensors 220 can be adapted to sense one or more of environmental information, i.e., environmental sensors, physiological information, i.e., physiological sensors, and any other information that might be useful in generation of the video/audiovisual content, e.g., behavioral sensors. It is understood that sensors can be used individually and/or combined. By way of illustration, sensors 220 can include one or more of temperature sensors, light sensors, accelerometers, motion sensors, cameras, microphones, facial detectors, magnetometers, pressure sensors, barometers, pulse monitors, heart rate sensors, infrared sensors, proximity sensors, moisture sensors, relative humidity sensors, position sensors, location sensors, e.g., a GPS receiver, gesture sensors, e.g., glance detectors, and the like. Output signals from the sensors 220 are provided to the ambiance processor 202. The ambiance processor 202 can use inputs from one or more of the sensors 220 to formulate instructions provided to the video/audiovisual processor 204 to that facilitate generation of the video/audiovisual content by the video/audiovisual processor 204.

With respect to the sensors 220 and incoming data, the system 200 can include a video camera sensor 220a and microphone sensor 220b to monitor both the visual and auditory input from the user 208 and environment 201, or room. The system 200 can include connections to remote elements, such as a central cloud system that can be adapted to (based on user permissions) collect data on the user's travel destinations, e.g., based on phone GPS, diary, commercial transactions, or calendar, favorite actors/shows, e.g., based on video watching history, location data of most frequented places (e.g., favorite activities), emotions that the user 208 is currently feeling, e.g., based on facial expression, body language, movement, and the like detected with the camera sensor 220a or biometrics from other sensors 220, such as Internet of Things (TOT) devices. By using the emotions of the user, the ambiance processor 202 can identify or otherwise keep track of shows/actors that have created particular emotions, such as those of comfort and/or security, enhanced physical performance, social media posts about things or places the user 208 likes or dislikes and/or their reaction to a current background being presented on the display device 206 to allow the system 200 to alter the background positively.

With respect to personalization, using the incoming data the background video scenes can be personalized according to places the user likes or dislikes, e.g., by avoidance, as well as things, animals or activities that the user likes or dislikes, by avoidance. By such modifications, including cancellation of a background scene and/or elements of the scene or soundscape, the system 200 can attempt to affect the user's current emotional state to promote a mood-enhancing state. In at least some embodiments, the system 200 is adapted to incorporate requests that the user 208 may have and dynamically retrieve and possibly edit to satisfy the type of scene that the user wants. It is understood that this process can include artificial generation of the scene. It is understood that the processes implemented by the system 200 can follow certain rules and guidelines for background video creation, e.g., not too noisy, not too erratic.

The illustrative embodiment also includes a user interface 222. The user interface 222 can be manipulated by a user to provide information to the ambiance processor 202. The ambiance processor 202, in turn, can process the user input alone and/or in combination with sensory input obtained from one or more of the sensors 220 to formulate instructions that when provided to the video/audiovisual processor 204, facilitate generation of the video/audiovisual content by the video/audiovisual processor 204. For example, the user 208 may select a scene or setting according to the user interface 222, e.g., a place, such as a café restaurant, a scenic locale, such as a beach setting, and in at least some instances, other attributes that can be processed by the ambiance processor 202.

It is understood that in at least some embodiments, the ambiance system 200 operates according to a feedback processing loop. For example, first video/audiovisual content is provided to the display 206 according to an initial condition, such as a selection by the user 208. One or more of the sensors 220 are operable proximate to the user 208, e.g., within the environment 201. Thus, the sensors 220 obtain sensory information proximate to the user and the display device 206. The ambiance processor 202 can process the sensory information to determine a state, e.g., a physical state and/or an emotional state, or a mood of the user. The ambiance processor 202 can evaluate the sensory information and compare it to a user selection. To the extent the comparison indicates favorable consistency between the objective user state or mood and/or environmental state and the user selection, the generated video/audiovisual content proceeds according to a current scheme. However, to the extent the comparison indicates a lack of consistency between the objective user state or mood and/or environmental state and the user selection, the ambiance processor 202 generates new instructions and/or otherwise updates previously generated instructions to the video/audiovisual processor 204. The new and/or modified instructions initiate modification(s) to the generated video/audiovisual content to produce revised video/audiovisual content. The revised content is presented on the display device 206 and the process continues trending a user state or mood and/or an environmental state to a target state or goal.

The illustrative ambiance system 200 includes user profiles 224. The user profiles 224 can be generated, updated, revised and otherwise maintained for one or more different users 208 and/or groups of users, such as family members, children, teens, and adults. The user profiles 224 can retain information about a user 208, such as historical information of past usages, ratings of past usages, likes, dislikes, advertisement preferences, past purchases, behavioral information, demographic information, psychographic information. It is envisioned that in at least some instances prior experiences using the ambiance system 200 can be identified as being positive, negative or neutral. In some embodiments, raw sensory information and/or processed sensory information, e.g., determining a user's mood, can be stored in the user profile in association with other parameters indicative of a particular, type or category of video/audiovisual content.

It is further understood that in at least some embodiments, the generated video/audio visual content can take the form of a story, for example, having recurring actors, changing situations and the like. In some embodiments the generated video/audiovisual content includes separately produced media, e.g., shows or content accessible through content service providers, such as NETFLIX ° or HULU® streaming media services. In such instances, the user profile 224 can store, record and/or update references, such as a date, a time, a program name, an episode, and the like. Such references can be useful to allow the user 208 to return to a previously experienced ambiance, allowing the ambiance processor 202 to continue from a previously stored or reproducible state. For situations in which a storyline is developing, the reference can allow a viewer to continue from a prior session, as though there were no break.

The ambiance system 200 can make allowances for remote input 225, which can include input from others. If the user 208 gives permission, others could also have input into the system so as to adjust the personal emotion profile—such as a psychiatrist that advises against seeing specific types of video (e.g., no overly populated scenes if the user is afraid of crowds).

For example, a parent, who may or may not be present within the environment during presentation of generated video/audiovisual content may provide remote input 225 to the ambiance processor 202 in relation to usage by a child user 208. Likewise, a medical professional, a teacher, a physical trainer an affinity group moderator, a friend and/or a coach may provide remote inputs 225. Such remote inputs 225 can take the form of instructions, recommendations, comments, observations, goals and/or suggestions. It is envisioned that the ambiance processor 202 can be in communication with one or more social media platforms, such as the FaceBook®, Twitter®, Instagram® social media platforms, and the like, e.g., through a network connection 228, such a the Internet a local area network, wired and/or wireless networks, such as wireless local area networks and mobile cellular networks. It is understood that the ambiance processor 202 can be configured to examine, interpret and/or apply input obtained from the social media platforms 227. For example likes and/or dislikes related to a social media post can be evaluated to determine or update a rating or ranking of a particular ambiance or video/audiovisual background setting. Consider a user who posts comments about an ambiance experience, and/or images, video clips and/or sounds from generated video/audiovisual content. Others may comment on or otherwise respond to the clips or samples through a social media service. The ambiance processor 202 can be adapted to evaluate the responses and in at least some instances to take action in response.

In at least some embodiments, one or more reports 226 can be generated in relation to performance of the ambiance processor 202, produced ambiance experiences, responses and/or moods of the user 208, and so on. It is understood that such reports 226 can be shared with the user 208, and/or with others, e.g., through social media, others, and/or through the remote input 225.

In general, inputs and/or sources of inputs to the ambiance processor 202 can include one or more of a data repository of anonymous reactions to backgrounds, remote machines to run machine learning on videos and/or reactions, a data repository of specific reactions to backgrounds for each person and/or for a group. Alternatively or in addition, other inputs and/or sources of inputs to the ambiance processor 202 can include a database of dynamic backgrounds associated with tasks, emotions and/or locations, a database of CGI characters that can be inserted, processing power for artificial CGI, and the like.

In at least some embodiments, the ambiance processor 202 includes an intelligence module 229 (shown in phantom). In some embodiments, the intelligence module 229 includes or otherwise implements artificial intelligence that can be applied according to one or more of the techniques disclosed herein. For example, the intelligence module 229 can implement to one or more of the various operational aspects of the ambiance processor 202, e.g., responsive to sensory input obtained from the sensors 220, manipulations of the user interface 222, determined or reported states or moods of the user 208, and the like. It is further envisioned that the intelligence module 229 can be adapted to learn causal relationships between certain aspects of video/audiovisual content as it relates to an associated ambiance, user reaction, like, dislike, mood, and so on. Machine learning can be applied to develop, and/or refine one or more algorithms, such as those applied in the feedback loop applications disclosed herein. In some applications, the results of machine learning can be applied in a general sense, e.g., to different users according to common moods or goals, to particular environments, according to determined or user identified activities performed by the user 208 during presentation of the video content, and so on. In at least some embodiments, anonymous data is aggregated to improve machine learning. For example, anonymous data can be aggregated from multiple users to improve an overall accuracy of the machine learning and its ability to provide a satisfactory or successful background videoscape.

The ambiance processor 202 can be preconfigured with one or more rules that can be applied to one or more of the various inputs, such as input obtained from the user interface 222, user profile(s) 224 and remote input 225. The rules can govern conflicts that may arise between one or more of user input, sensory input, remote input and/or user profiles. For example, the rules can set limitations and/or restrictions as may be appropriate.

There are numerous ways in which the user 208 can provide different input and control to the ambiance system 200. For example, the user can choose a scene. Namely, the user can choose a specific background scene or a type of scene. Instead of only choosing each time what kind of environment (e.g., nature vs. busy café) and letting the system 200 add CGI features or other elements, the user 208 could choose to go specifically to a particular combination.

Other controls can allow the user 208 to save a scene. For example, the user 208 can purposely save a session to revisit later. One or more of the background, CGI elements, and/or interactions can be saved so that the user 208 can return to the session and continue on from where they were.

The user 208 can also input a specific behavioral goal they might want to achieve, and the system can provide scenes that match those goals and even ramp up the intensity of how much it addresses the goal over time. For example, if the goal is to reduce spending habits the scenes may have very little expensive items in them and even be adapted to reduce representations of such items over time. Expensive items can be removed altogether or substituted with less expensive items.

Still other controls can allow the user 208 to inform the system 200 to avoid certain content, e.g., scenes, actors and the like, that triggers certain emotions. For example, someone who does not like heights can inform the system 200 to avoid high aerial footage, which the system 200 would comply with when selecting, generating and/or modifying a background or scene. The user 208 can also inform the system 200 to avoid triggering specific emotions, to which the system 200 would comply by avoiding anything that looked like it was about to trigger that emotion whenever they were using the system.

Figure 2B:
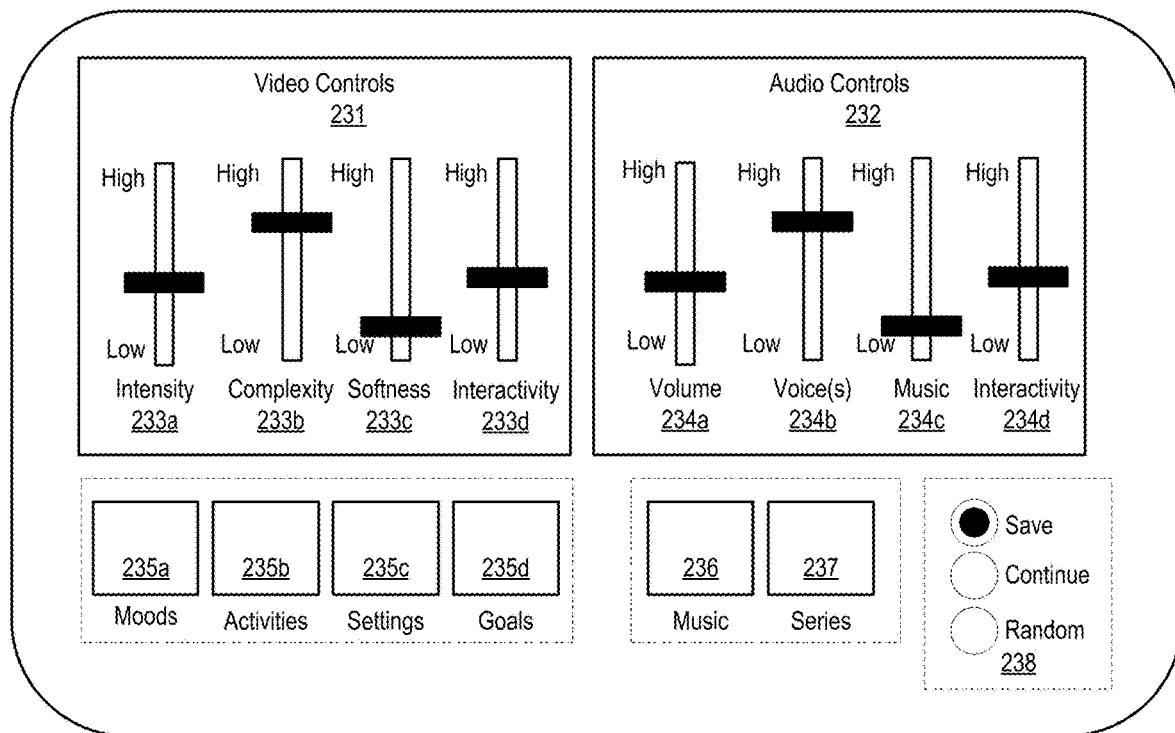
FIG. 2B is a block diagram illustrating an example, non-limiting embodiment of a user interface of the ambiance system of FIG. 2A, in accordance with various aspects described herein.

FIG. 2B is a block diagram illustrating an example, non-limiting embodiment of a user interface 230, such as the user interface 222 of the ambiance system of FIG. 2A, in accordance with various aspects described herein. The user interface 230 can include a graphical user interface, e.g., providing text, images and/or soft controls, such as toggle buttons, slide buttons, rotary switches, selectable pull-down lists, and the like. The controls can be manipulated according to user interaction with the graphical user interface 230. For example, the user may use a pointing device, a touch screen, a keyboard, and/or gestures to manipulate the various controllable elements of the user interface 230.

In the example graphical user interface 230, separate controls are provided for video controls 231 and audio controls 232. The video controls 231 can include one or more of an intensity control 233a, a complexity control 233b, a softness or diffusion control 233c, an interactivity control 233d. The intensity control 233a can control an illumination or intensity of a display. The complexity control 233b can control a complexity of the generated video. Complexity can include, without limitation, a resolution of the video, a number of items portrayed in the video, a number of characters in the video, and so on. The softness control 233c can adjust a video resolution and/or application of a diffuse filter. Similarly, the interactivity control 233d can adjust a degree to which the video/audiovisual presentation reacts or otherwise responds to environmental stimuli, such as noises, lighting, movement, and the like. In the illustrative example, all of the video controls 233a, 233b, 233c, 233d, generally 233, are illustrated as slide switches variable between low values and high values according to user manipulation, e.g., according to a pointing device.

According to the illustrative example graphical user interface 230, the audio controls 232 can include one or more of a volume control 234a, a voice(s) control 234b, a music control 234c, an interactivity control 234d. The volume control 234a can control a volume of an aspect of an audio portion of the video/audiovisual presentation, such as an overall volume, a relative volume of speech to background noise, and so on. The voices control 234b can control a quantity, type and/or clarity of voices within the background audio. For example, the voices can include a chatter, a babble, a conversation, and the like. The music control 234c can adjust a volume of any background music, such as a score, a computer-generated sound or a soundtrack, e.g., a song. Similarly, the interactivity control 234d can adjust a degree to which an audio portion of the video/audiovisual presentation reacts or otherwise responds to environmental stimuli, such as noises, lighting, movement, and the like. In the illustrative example, all of the audio controls 234a, 234b, 234c, 234d, generally 234, are illustrated as slide switches variable between low values and high values according to user manipulation, e.g., according to a pointing device.

In at least some embodiments, the user interface 230 includes one or more controls that allow the user to provide additional input. For example, the controls can include a mood selector control 235a, an activity identification control 235b, a setting identification control 235c, e.g., identifying a preferred setting to be included in the generated videoscape, and a goal selector 235d, allowing a user to identify a particular goal, such as focus, concentration, enhanced physical performance, and the like. Other controls can include a music selection control 236 and/or a series and/or program selection control 237. Still other controls 238 can be provided to manage operation of the ambiance system 200 (FIG. 2), e.g., allowing a user to save a setting or configuration and/or to save a particular generated scene, videoscape and/or storyline. For example, a stop, pause and/or continue control can be provided to allow a user to control their ambiance experience in a manner similar to operation of a DVR. It is further envisioned that the other controls can include a random selection control that can be used to randomize a complete ambiance experience, and/or one or more aspects of a tailored ambiance experience. For example, a particular scene, channel and/or program may be selected, while certain aspects of the videoscape, such as characters, interactivity, sound, and the like can be randomized to remove aspects of predictability.

Figure 2C:
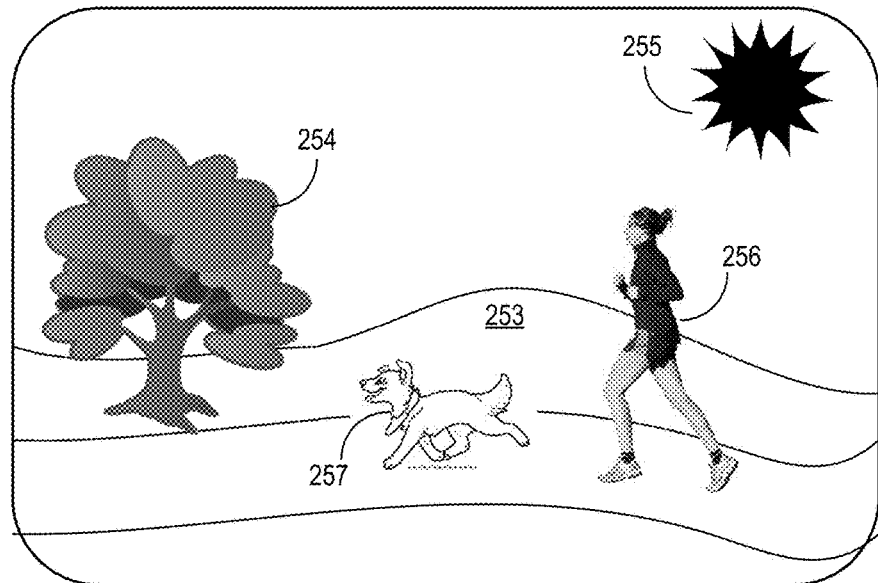
FIG. 2C is a block diagram illustrating an example, non-limiting embodiment of an ambiance display presented at a display device of the ambiance system of FIG. 2A, in accordance with various aspects described herein.

FIG. 2C is a block diagram illustrating an example, non-limiting embodiment of an ambiance display 250 presented at a display device 206 of the ambiance system 200 of FIG. 2A, in accordance with various aspects described herein. The example display 250 includes a background scene 253, e.g., rolling hills, sky and a walking path. Other elements within the scene 253 include one or more environmental structures, such as buildings, automobiles, trees 254 and the sun 255. The example scene 253 also includes actors. Namely, a person 256 engaged in a running activity is portrayed as running through the scene, along the path of the background. A second actor includes an animal, i.e., a dog 257. According to the example, the dog 257 is also running along the same path as the jogger 256. Depending upon settings of the graphical user interface 230, background music may be planning, perhaps the dog is barking, birds may be chirping, background traffic noise from a roadway, not visible, may be includes along with airplane noise, etc. In some embodiments, the background video/ audiovisual includes personalized television shows. Examples of dynamically creating and/or modifying television shows to meet a viewer's preferences is disclosed in U.S. patent application Ser. No. 15/631,397, entitled "System and Method for Dynamically Providing Personalized Television Shows," filed on Jun. 23, 2017, the entire disclosure of which is incorporated herein by reference in its entirety.

Figure 2D:
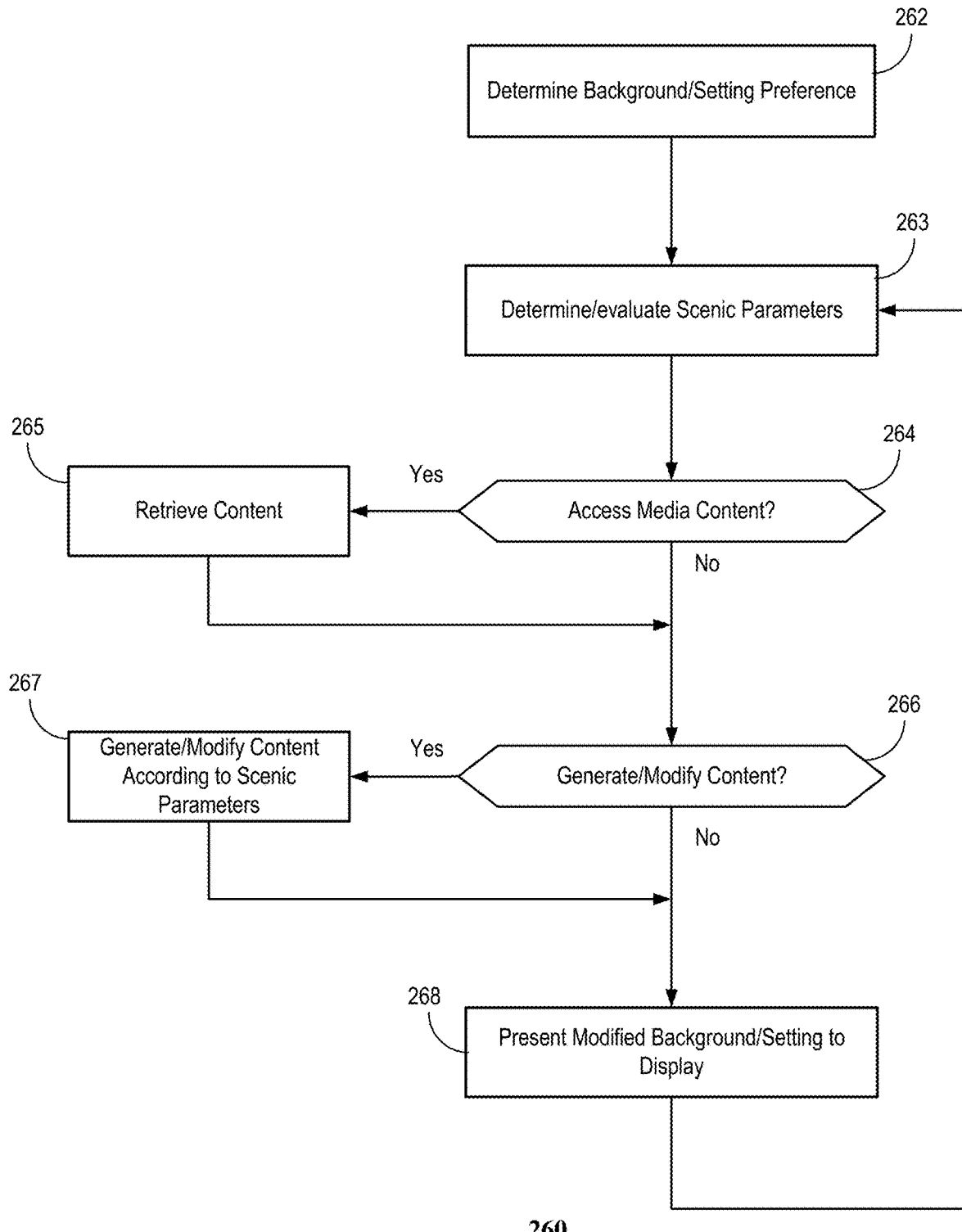
FIG. 2D depicts an illustrative embodiment of an ambiance setting process in accordance with various aspects described herein.

FIG. 2D depicts an illustrative embodiment of an ambiance setting process 260 in accordance with various aspects described herein. A background setting preference is determined at 262. Determination of the background setting preference can be accomplished according to the various techniques disclosed herein. For example, a user may provide a selection at a user interface from among listing, e.g., a drop-down list, of available background settings. Alternatively or in addition, the setting can be determined according to a user expressed mood, goal or activity, e.g., quiet study, intense exercise, household chores. It is envisioned that certain predetermined background settings can be generally associated with particular moods, goals and/or activities. In other instances, AI can be applied, in the form of machine learning, to identify which background settings would be most conducive to a particular mood, goal or activity.

Scenic parameters are determined and/or evaluated at 263. This can include evaluation of selections and/or instructions provided at a user interface, obtained through user profiles, and the like. Selections can include particular settings, interactivity, sound levels, etc. Alternatively or in addition, the scenic parameters are determined and/or adjusted according to predetermined rules, e.g., parental limits, self-imposed limits, third party input, and so on.

A determination is made at 264 as to whether to access media content. For example, the ambiance processor 202 (FIG. 2) can assess whether background setting preferences and/or scenic parameters can be serviced with existing and/or accessible video content, and/or whether modifications, such as video editing, CGI would be required. To the extent it is determined at 264 to access media content, the process 260 proceeds to retrieve content at 265, after which the process 260 proceeds to step 266. Content retrieval can include accessing media programs according to a service provider lineup, e.g., according to a media guide, according to a video on demand library and/or service, and/or according to personal video content, e.g., accessible on a DVR, and the like.

To the extent, however, that it is determined at 264 that access to media content is unnecessary, the process 260 proceeds to step 266, where a determination is made as to whether the content should be generated and/or modified. To the extent it is determined at 266 that the content should be generated and/or modified, the content is generated and/or modified according to the scenic parameters at 267 and according to one or more of the various modification techniques disclosed herein or otherwise known to those skilled in the art of video modification. The process 260 proceeds to step 268. To the extent, however, that it is determined at 266 that the content should not be generated and/or modified, the process 260 also proceeds to step 268. According to step 268, the generated and/or modified content is presented to a display device to serve as a background or setting to a user activity other than watching the content.

Figure 2E:
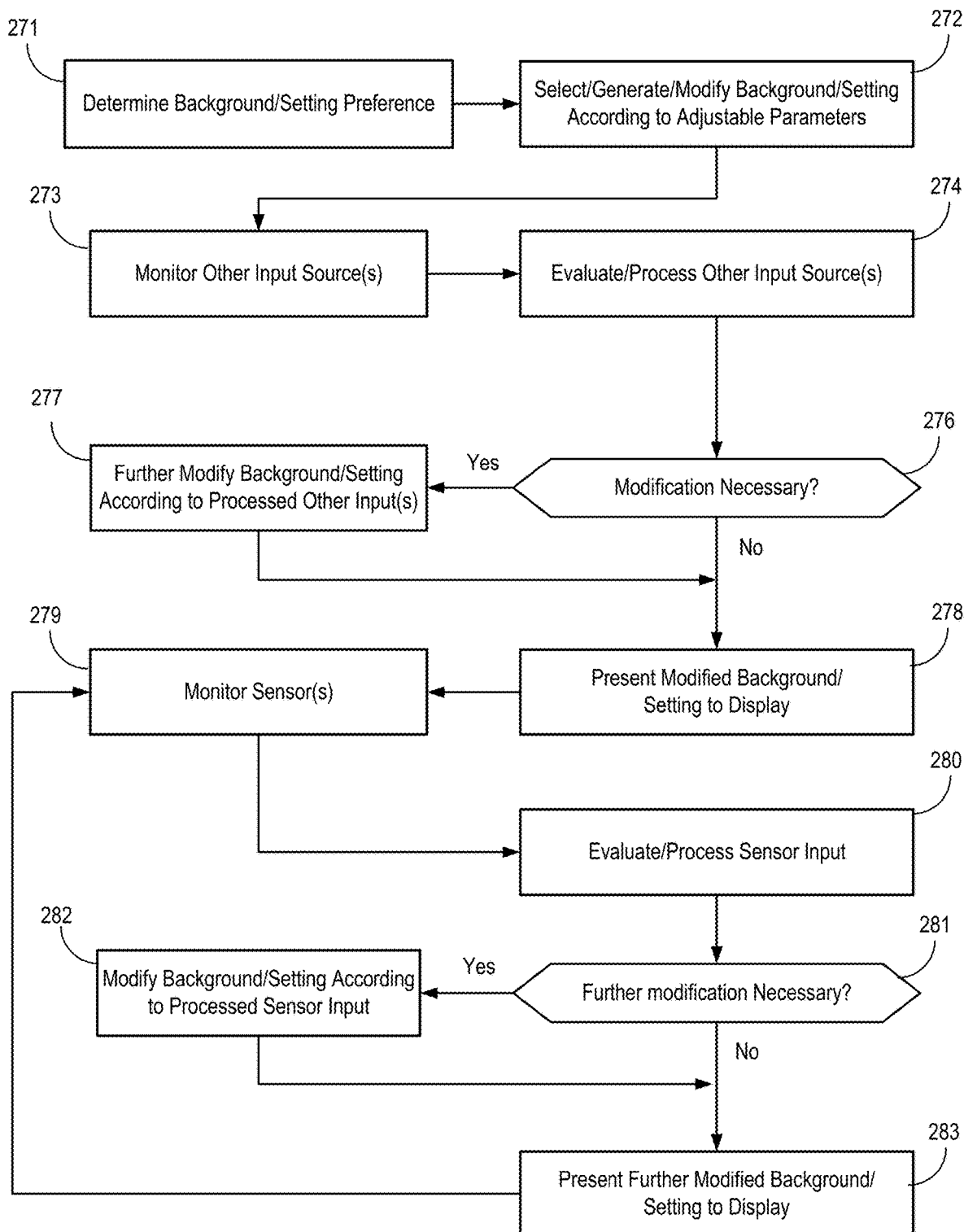
FIG. 2E depicts an illustrative embodiment of an ambiance setting in accordance with various aspects described herein.

FIG. 2E depicts an illustrative embodiment of an ambiance setting process 270 in accordance with various aspects described herein. As in preceding process 260 (FIG. 2C), a background and/or setting preference is determined at 271. The background/setting preference is selected and/or generated and/or modified or otherwise adjusted according adjustable parameters at 272. For example, a background setting may be determined according to a user selection of a scene, e.g., a café restaurant, and modified according to user input provided at a user interface, as to certain aspects of the scene, e.g., busyness, number of characters, noise level, types of noises, and the like.

Other input sources are monitored at 273. This can include the monitoring of sensory input obtained from sensors 220 (FIG. 2B), including any of the various sensors discloses herein or otherwise known to those skilled in the art of sensory systems. Other input sources can include user preferences, e.g., obtained from a user profile, from past history, and the like. Still other input sources can include social media applications, input from individuals other than the viewer, and the like. Input(s) obtained from other source(s) at 273, is processed at 274.

A determination is made at 276 as to whether any modifications of the selected/generate/modified background setting determined at 272 is necessary, e.g., to address information obtained from the other input sources at 273 and/or according to the evaluation and/or processing of information obtained from these other input sources at 274. To the extent it is determined at 276 that modification is necessary, the process 270 proceeds to further modify the background/setting at 277. The process 270 next proceeds to step 278. To the extent it is determined at 276 that further modification is unnecessary, the process 270 also proceeds to step 278. From there, the process 270 presents and/or forwards the modified background/setting to a display device.

According to the example process 270, one or more sensors are monitored at 279, while the modified background setting is presented at a display device proximate to a user. The sensors can include any of the sensors disclosed herein or generally known to those familiar with sensor systems. The additional sensor input is evaluated and/or processed at 280. Evaluation and/or processing can include combining sensor data, comparing sensor data to thresholds and/or ranges, comparing sensor data to historical sensor data, an application of rules, e.g., rules of sensor processing and/or interpretation of sensor data and so on.

A determination is made at 281 as to whether further modifications are necessary, e.g., in response or reaction to the evaluation and/or processing of the sensory data obtained at 280. To the extent it is determined that further modifications are necessary, the process 270 proceeds to modify the background/setting according to the processed sensor input at 282. The process 270 next proceeds to present the further modified background/setting to a display device at 282 proximate to the user and proceeds to step 283 to present the further modified background/setting information at the display device. To the extent, however, it is determined that further modifications are unnecessary, the process 270 proceeds to step 283.

The process 270 includes a feedback loop in which processing proceeds from step 283, to return to step 279, further monitoring the sensors, evaluating the updated sensor input at 280, determining whether further updated modifications are necessary at 281, and so on.

The processes disclosed herein provide a means for generating a personalized background video source. The background service can be implemented in according to an automatic process and preferably requires little to no user interaction. It is believed that the backgrounds and settings provided by the background service and/or system can provide an increased sense of presence and immersion based on its reaction to noise, movement and gaze. For example, sensory input monitored at 279 might identify a gaze of the user towards the display, a loud noise if the user drops something, or perhaps dialog or noises from the user. The background/settings can be adapted to respond to such inputs, in some instances to acknowledge the interaction to foster a sense of connectedness, e.g., a CGI character of the background waving, or speaking. In other instances, the background/settings can be adapted to respond to such inputs to alter settings to reduce user interaction, e.g., if a user has chosen a mood or task associated with concentration or study. In these instances, the background/settings should not become a new source of distraction. Thus, the techniques and systems disclosed herein are adapted to provide an increased sense of comfort, relaxedness, security and productivity since the system tailors itself to the user specifically and their mood & task. It is understood that in at least some embodiments, the system and/or process is adapted to learn from a user's reactions to improve performance to better meet the user's needs over time.

While for purposes of simplicity of explanation, the respective processes 260, 270 are shown and described as a series of blocks in FIGS. 2D and 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In some embodiments, the system is personalized based on re-occurring user patterns. For example, the system can notice patterns of behavior, clothing, objects that the user exhibits and incorporate that into the background video or interact with the user to increase a sense of comfort and/or inclusion. An example would be someone that is always cooking with the background system on. It may actually interact and ask what they are cooking today and if they brought some for everyone. Or it could be more passive and choose to have cooking shows on.

The system can also be adapted to learn to identify (through video or audio) who is using the system such that the specific learnings are associated with a specific person or group of people. For example, the system can implement individual and/or group identification profiles.

The system can respond dynamically to increase a sense of presence that a user feels as well as an emotional tie to a scene. For example, the scenes can react to auditory, motion or gaze detection. If the user makes a sound, then the background scene can react in a realistic way and to different levels. For example, with a nature scene that has animals in it some of the animals could stop and look at the user if they make a loud noise. Sudden movements could also trigger the background scene to interact or change.

The system can include a gaze detection, e.g., using a video camera and image processing to determine a direction of a user's gaze. If the system detects that a user is looking straight at the scene then things could react to that (bird flies away or coos at them).

The system can also be adapted to monitor and in at least some instances respond to reactions and/or emotions, e.g., through machine learning to provide enhanced personalization features. For example, the system can monitor the user's reactions (facial video, biometrics from IoT) to a scenes and decide to change the scene at that time and/or record the reaction and learn through an application of machine learning to not show that particular or even a similar scene again. Such monitored user reaction forms an input to any machine learning system adapted to, over time, learn the specific reactions from a particular person (or group of people) and tailor the backgrounds even more so to them.

In general, the background video selected, modified and/or generated herein can be used for different purposes. Some use it to have a sense of comfort and security and to not feel alone. Others use it to try to increase their productivity with a high-energy feeling. Others use it to have a more relaxed feeling (e.g., babbling brook). The system will determine the mood and task the person is trying to achieve and modify the video accordingly. For example, if the person is trying to work and has shown interest in high-energy, busy café s for this then this type of background would be used. However, if the person is trying to relax and has shown propensity to relax more with nature scenes then it may show a particular nature scene.

Over time the system 200 (FIG. 2) continually gathers information about the user (from sources mentioned in the description) that can help determine what types of video the user(s) will like. This information can be saved to a profile 224 in the cloud or in an application. According to an example embodiment, the system 200 receives a command to begin playing a background. A sensor 220, such as a camera, a microphone, a gaze detector and/or motion detection hardware (or software) gather information on current emotion and task of user 208.

The system 200 can consult with a cloud database for a particular user on what video to play for current emotion and/or task. Alternatively or in addition, a combination of recent data from information gathered about the person (their likes), current trips etc., is used as well as recent machine learning associations based on current anonymous data that match current mood and/or task.

System plays background video to be presented in proximity of a user 208, without an expectation that the user 208 would actively watch or engage with the background. The system can be adapted to monitor for audio, motion, emotions, gaze, and when detected, e.g., a gaze at the display device, a change of emotion or audio, the ambiance processor 202 can be adapted to switch video to an appropriate generation and/or playback that matches the event. If no existing video matches that event, then CGI can be imported as might be appropriate according to the detected event and/or the particular user.

Information is gathered on reactions and emotions associated with the scene and recent video or CI changes and stores them for this person and anonymously for general learning algorithms. Others (if permitted) can also input information into the cloud system to modify the video. The user 208 can also directly input information on things they like and dislike.

By way of further example, a user is studying at home. The user turns on their TV in a background mode, e.g., launching an application program according to the techniques disclosed herein. The user sees a busy café scene that is mentally stimulating. The portrayed environment may be similar to a user choice, such as a choice to study at a particular location, such as a Starbucks® store. If the user causes an unexpected noise or sudden movement, e.g., drops a coffee mug that shatters on the floor, the on-screen background setting on the user's TV can be adapted to portray characters in the café scene as turning to look wards the user, before returning to their normal activities and/or conversations. The user, in turn, may glance at the screen and see that the TV characters noticed and responded to the dropping of the mug. Consequently, the user feels a sense of presence within the background setting, and perhaps a sense of companionship to the portrayed characters.

In another example, a user is cooking dinner in his kitchen, while trying to relax and unwind from a busy day. The user turns on his tablet in a background or settings mode, e.g., launching an app. The user, who has previously indicated that he finds being around water to be relaxing, sees a natural scene of a peaceful stream. As camera sensor(s) note that the user is starting to relax, the user notices interesting CGI elements that begin to be added into the scene, e.g., at the instruction of the ambiance processor and in cooperation with the CGI module 212 of the video/audiovisual processor 204. For example, birds land on a branch of a tree near the stream. Whenever the sensors detect that the user glances at the screen, e.g., that the user's gaze is detected toward the tablet display, the birds briefly take flight before resettling on the branch. The user may smile at the site of the flying birds, which can be detected and/or recorded as a positive reaction to the CGI modification. Consequently, the user feels relaxed and lightly entertained.

The system 200 can be adapted to allow a user to build an ongoing scene/relationship where they would not start anew every session but be part of an ongoing story. For example, maybe the first few times a user drops something, the characters just turn their heads at the sound, but after the fourth time, they laugh and say, "not again." The number of times an item was dropped could continue on past a session so that interactions ("not again") are not repeated.

The solution could also be extended to include dynamic advertisements, ads, or ad placements, e.g., using video selection, e.g., to insert a commercial and/or CGI technology to insert an ad placement. Instead of working off a profile or other static or existing information, items can be placed in a particular scene, such as a café scene and adjusted for the user's current environment and emotional state. This can include items that are relevant to things a user is doing, including reading (books), spilled coffee (paper towels), or other objects that fit the atmosphere they have chosen.

In at least some embodiments, the system 200 responses are more purposeful. For example, instead of simply being a companion or making changes to a scene simply for entertainment purposes, the system 200 can be adapted to provide feedback designed to shape the user's behavior. For example, if a person is in anger management therapy and they show signs of anger, the system 200 may not only provide cues to help them calm down, but may do it in such a way that the person's behavior would be changed over time.

In at least some embodiments, the system 200 and/or processes 260, 270 are adapted to allow for an element of gaming on the user's part. Examples can include, without limitation, rewarding interactions that can be pre-programmed into a system, and the user displays certain behaviors in order to activate those interactions. Such rewards can include a scene change, e.g., a change of color, intensity, or setting, a character reaction, inclusion of a new character, and so on. Alternatively or in addition, such rewards can include a change in an audio portion, such a playing of a pleasing audio sound or jingle, a favorite song, pleasing sounds, and so on.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communications system 100, the subsystems and functions of system 200, and processes 260 and 270 presented in FIGS. 1, 2A, 2B, 2C, 2D, 2E and 3. For example, virtualized communication network 300 can facilitate in whole or in part generation of video content suitable for adding and/or altering the ambiance of a particular location or environment, for altering a mood and/or behavior of a viewer, and the like.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third party locations.

Figure 4:
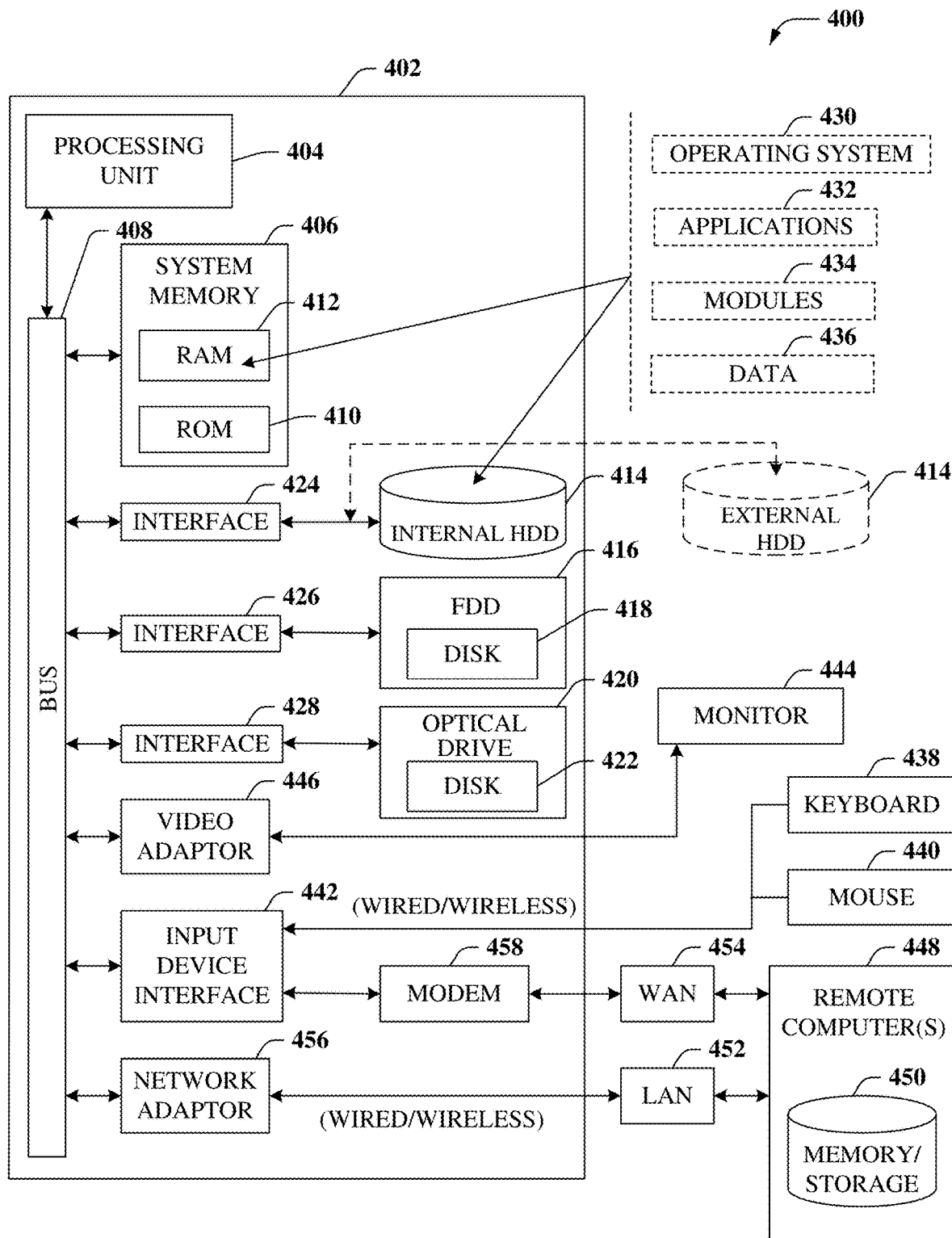
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part generation of video content suitable for adding and/or altering the ambiance of a particular location or environment, for altering a mood and/or behavior of a viewer, and the like.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
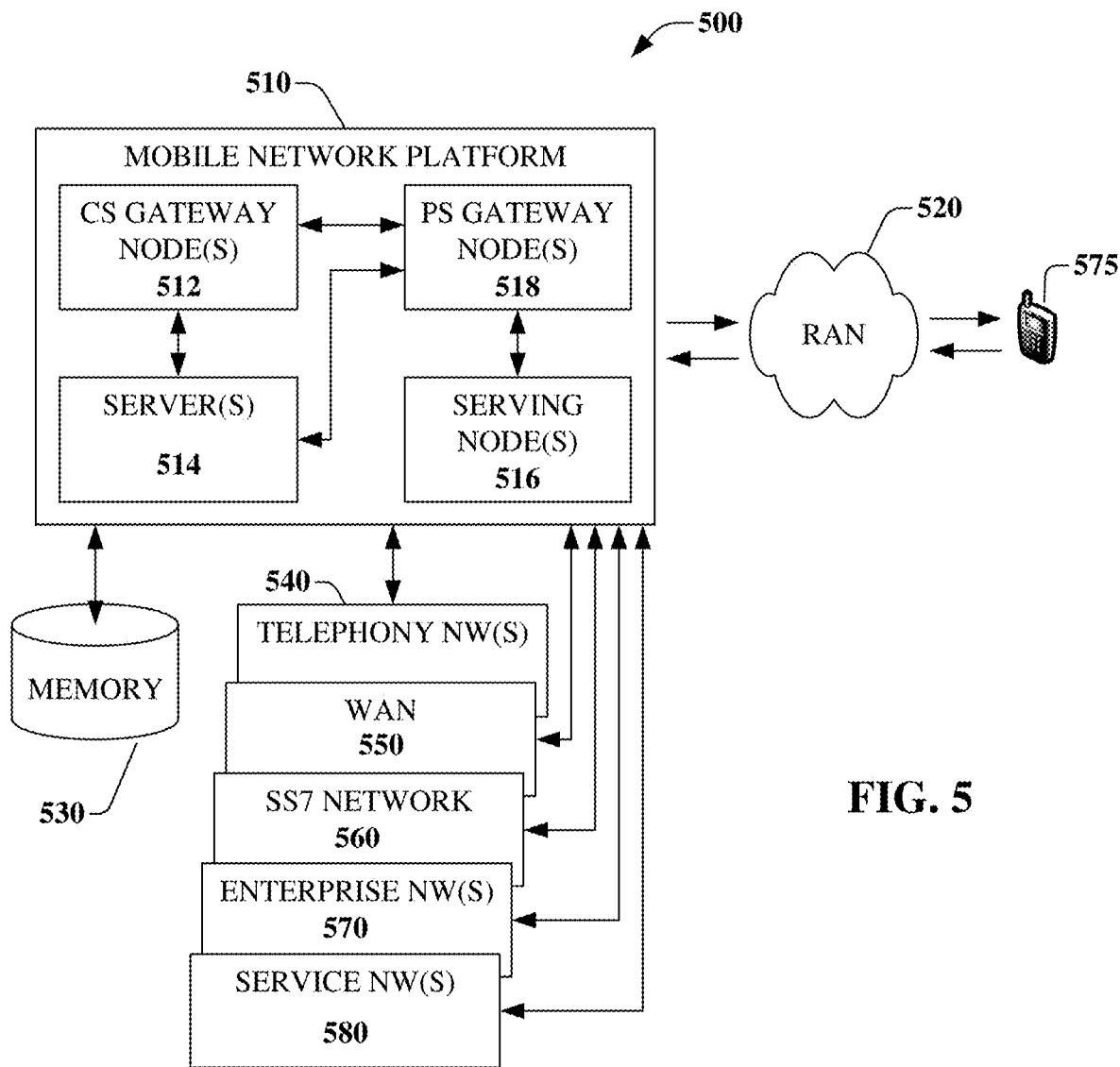
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part generation of video content suitable for adding and/or altering the ambiance of a particular location or environment, for altering a mood and/or behavior of a viewer, and the like. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
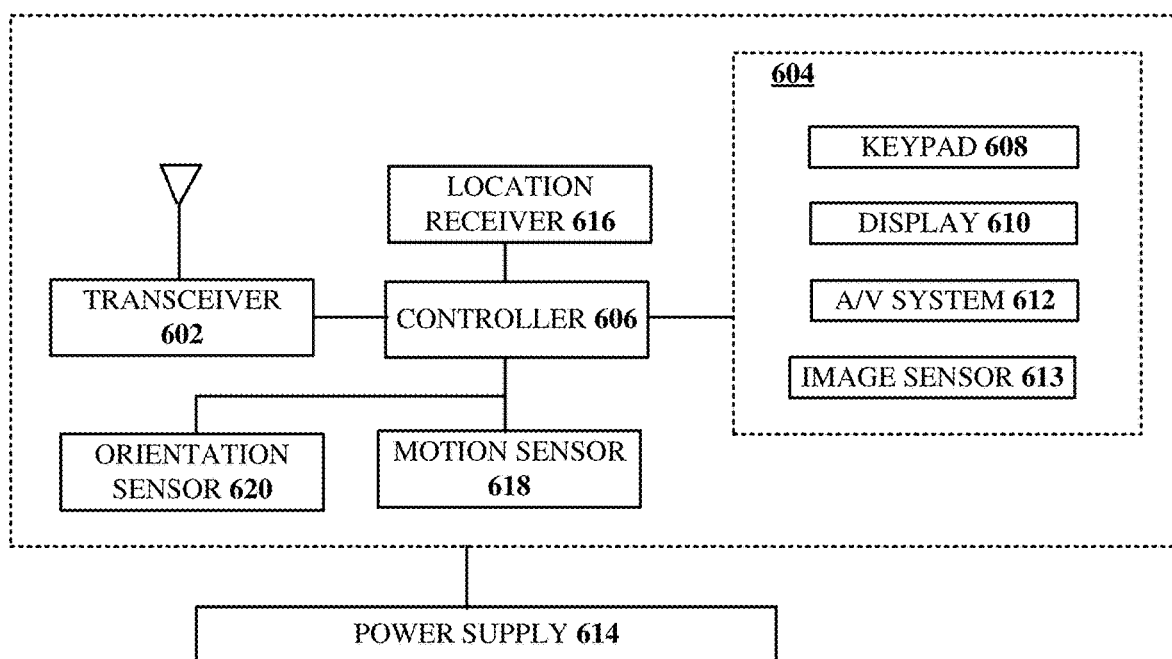
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part generation of video content suitable for adding and/or altering the ambiance of a particular location or environment, for altering a mood and/or behavior of a viewer, and the like.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=\text{confidence (class)}$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
generating, by a processing system including a processor, a video scene adapted to establish an ambiance setting;
providing, by the processing system, the video scene to equipment of a user for presentation at a display device;
receiving, by the processing system, a selected degree of interactivity, wherein the selected degree of interactivity determines a magnitude of reaction by generated video responsive to changes in environmental stimuli, and wherein the selected degree of interactivity is selected by the user at a graphical interface presented at the display device;
detecting, by the processing system, an environmental stimulus proximal to the display device; and
modifying, by the processing system, the video scene to obtain a modified video scene responsive to the detecting the environmental stimulus and according to the magnitude of reaction associated with the selected degree of interactivity.

2. The method of claim 1, wherein the environmental stimulus includes a sound generated by the user, a motion of the user, or a combination thereof, and further comprising estimating, by the processing system, one of an emotional state, a physical state, or both of the user to obtain a user state estimate according to sensory input obtained proximate to the user, wherein the modifying of the video scene is further based upon the user state estimate.

3. The method of claim 1, further comprising:
determining, by the processing system, a user state according to sensory input obtained proximate to the user;
identifying, by the processing system, a target user state; and
determining, by the processing system, a variance between the user state and the target user state, wherein the modifying of the video scene is further based upon the variance.

4. The method of claim 1, further comprising:
receiving, by a processing system including a processor, an ambiance selection from among a plurality of different ambiance choices, wherein the video scene is determined according to the ambiance selection, and wherein the plurality of different ambiance choices is selected from a group comprising a geographic location, a type of setting, a mood, and any combination thereof.

5. The method of claim 1, wherein the modifying of the video scene further comprises incorporation of computer-generated imagery.

6. The method of claim 3, wherein the sensory input comprises input obtained from sensors selected from a group comprising an environmental sensor, a camera, a motion detector, an accelerometer, a microphone, a temperature sensor, a light sensor, an infrared sensor, a physiological sensor, a pulse monitor, a blood pressure monitor, and any combination thereof.

7. The method of claim 4, wherein the generating of the video scene further comprises obtaining, by the processing system, pre-generated video content, wherein the pre-generated video content is selected according to the ambiance selection.

8. The method of claim 7, wherein the generating of the video scene further comprises modifying, by the processing system, the pre-generated video content according to the ambiance selection.

9. The method of claim 5, further comprising:
receiving, by the processing system, an ambiance selection; and
generating, by the processing system, the computer-generated imagery according to the ambiance selection of a plurality of different ambiance choices.

10. A device, comprising:
a processing system including a processor; and
a memory that stores executable instructions that, when executed by the processing system, facilitate performance of operations, the operations comprising:
generating a video scene adapted to establish an ambiance setting;
providing the video scene to equipment of a user for presentation at a display device;
receiving a selected degree of interactivity, wherein the selected degree of interactivity determines a magnitude of reaction by generated video responsive to changes in environmental stimuli, and wherein the selected degree of interactivity is selected by the user at a graphical interface presented at the display device;
detecting an environmental stimulus proximal to the display device; and
modifying the video scene to obtain a modified video scene responsive to the detecting the environmental stimulus and according to the magnitude of reaction associated with the selected degree of interactivity.

11. The device of claim 10, wherein the operations further comprise estimating one of an emotional state, a physical state, or both of the user to obtain a user state estimate according to sensory input, wherein the modifying of the video scene is further based on the user state estimate.

12. The device of claim 10, wherein the generating of the video scene further comprises obtaining pre-generated video content, wherein the pre-generated video content is selected according to the ambiance setting.

13. The device of claim 10, wherein the operations further comprise:
determining a user state according to sensory input obtained;
identifying a target user state; and
determining a variance between the user state and the target user state, wherein the modifying of the video scene is further based on the variance.

14. The device of claim 12, wherein the operations further comprise:
determining an ambience selection, wherein the ambiance setting is based on the ambiance selection, wherein the generating of the video scene further comprises modifying the pre-generated video content according to the ambiance selection.

15. A non-transitory, machine-readable medium, comprising executable instructions that, when executed by a processing system including a processor, facilitate performance of operations, the operations comprising:
generating a video scene adapted to establish an ambiance setting;
providing the video scene to equipment of a user for presentation at a display device;
receiving a selected degree of interactivity, wherein the selected degree of interactivity determines a magnitude of reaction by generated video responsive to changes in environmental stimuli, and wherein the selected degree of interactivity is selected by the user at a graphical interface presented at the display device;
detecting an environmental stimulus proximal to the display device; and
modifying the video scene to obtain a modified video scene responsive to the detecting the environmental stimulus and according to the magnitude of reaction associated with the selected degree of interactivity.

16. The non-transitory, machine-readable medium of claim 15, wherein the operations further comprise estimating one of an emotional state, a physical state, or both of the user to obtain a user state estimate according to a sensory input, wherein the modifying of the video scene is further based on the user state estimate.

17. The non-transitory, machine-readable medium of claim 15, wherein the generating of the video scene further comprises obtaining pre-generated video content, wherein the pre-generated video content is selected according to the ambiance setting.

18. The non-transitory, machine-readable medium of claim 15, wherein the operations further comprise:
determining an ambience selection, wherein the ambiance setting is according to the ambiance selection, wherein the ambience selection is determined from among a plurality of different ambiance choices consisting of a geographic location, a type of setting, a mood, and any combination thereof.

19. The non-transitory, machine-readable medium of claim 16, wherein the sensory input comprises an image of the user proximate to the display device.

20. The non-transitory, machine-readable medium of claim 17, wherein the operations further comprise:
estimating a user state according to sensory input;
determining a target user state; and
identifying a variance between the user state and the target user state, wherein the modifying of the video scene is further based on the variance.

* * * * *